Aug. 8, 1950     R. R. KENNEDY     2,517,883
APPARATUS FOR TREATMENT OF TURBID LIQUIDS
Filed Sept. 7, 1946     2 Sheets-Sheet 1
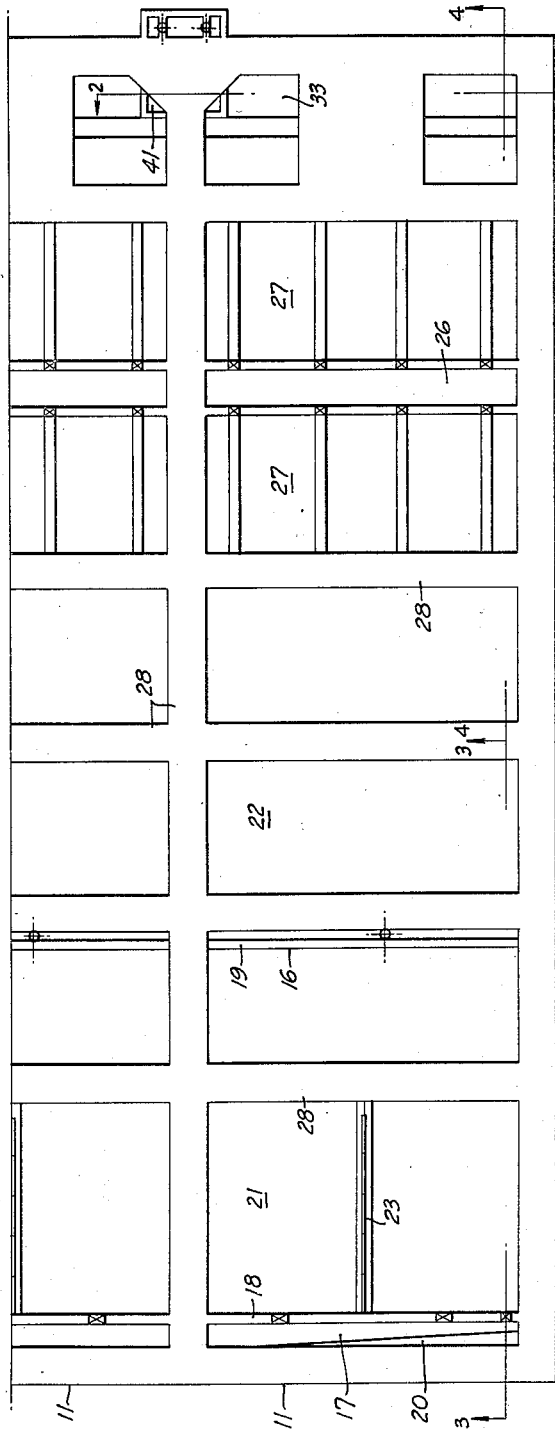
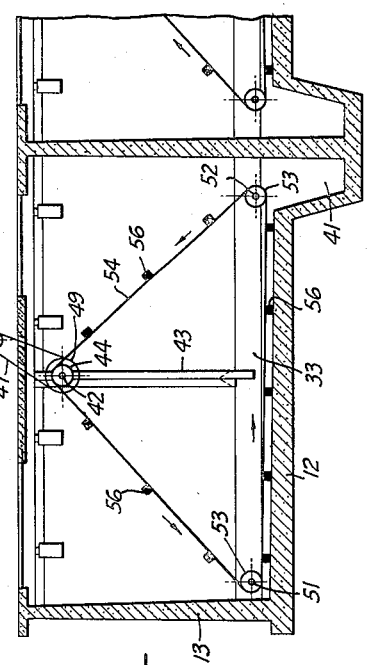
*INVENTOR.*
Richard R. Kennedy
BY
*ATTORNEY*

Aug. 8, 1950 — R. R. KENNEDY — 2,517,883
APPARATUS FOR TREATMENT OF TURBID LIQUIDS
Filed Sept. 7, 1946 — 2 Sheets-Sheet 2
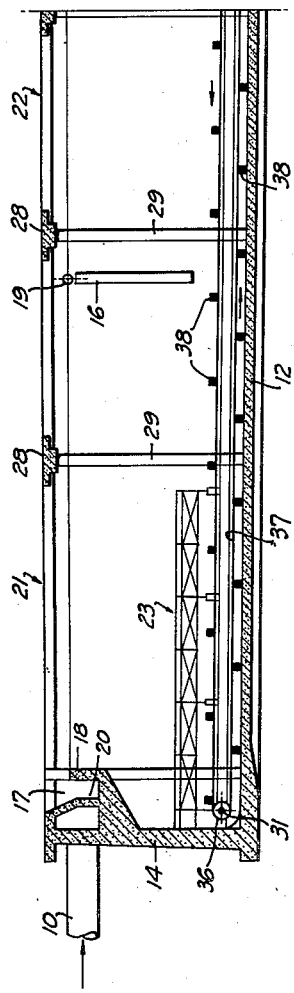
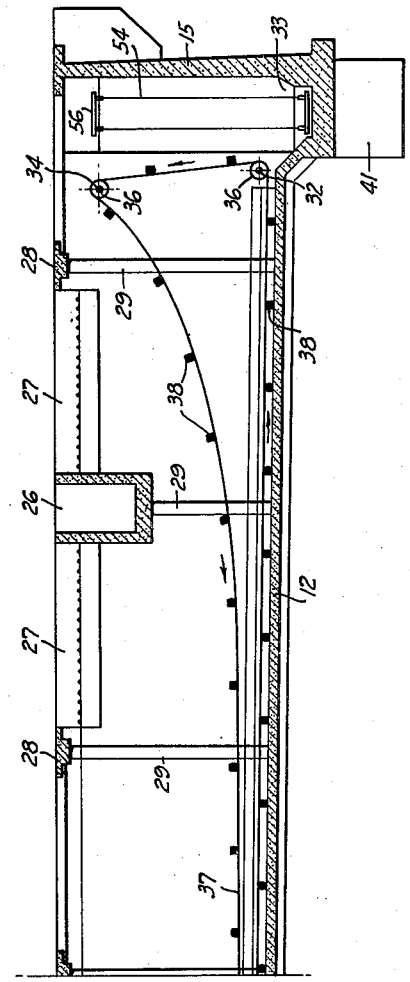
INVENTOR.
Richard R. Kennedy
BY
ATTORNEY Patented Aug. 8, 1950

2,517,883

UNITED STATES PATENT OFFICE 2,517,883

APPARATUS FOR TREATMENT OF TURBID LIQUIDS

Richard R. Kennedy, Palo Alto, Calif.

Application September 7, 1946, Serial No. 695,521

6 Claims. (Cl. 210—16)

This invention relates to the treatment of turbid liquids as may be provided by water, sewage, trade wastes, chemicals and, in fact, any liquid from which it is desired to remove solids.

More particularly, the present invention relates to an improved apparatus for the purification of liquids. This apparatus comprises a generally rectangular tank or trough through which the liquid to be purified flows from one end to the other. At the inlet end of the tank means are provided for releasing air in the influent liquid to aerate the liquid, to sweep out of the liquid any entrained gases, to satisfy the biological oxygen demand of the liquid and to coagment solids in the liquid and to keep solids in a mobilized suspension by the air agitation until the solids have collected into settleable flocs. Preferably the tank or trough is so arranged that aeration is effected only in the initial portion of the tank, the remainder of the tank being available for sedimentation. In accordance with this invention, the sedimentation zone is, in fact, provided by two different regions in the tank, one region being immediately adjacent to the aeration zone while the other is provided by the remainder of the tank; the two sedimentation regions are separated by a dividing or partitioning means which extends transversely of the tank or trough and substantially delineates one region from the other so that only a regulated liquid transfer occurs. Insofar as the individually desired operating devices are concerned, this dividing or partitioning means can take the form of a baffle wall structure extending transversely of the tank and so positioned that the liquid can flow through the tank freely and without such restriction as results in the breaking up of the flocs present in the water.

In prior apparatus of the same general type and in which a liquid is arranged to flow generally in a horizontal direction through a channel in which initially flocculation is attempted, followed by a later sedimentation, dependence is placed upon the fluid currents established in the liquid to carry the flocs and move these on into a sedimentation zone. In practice, this has not proven satisfactory, particularly when the agitation is effected by mechanical means, for the tendency exists for the settleable flocs to build up into a pile or piles in those regions of the tank wherein the agitation is at a minimum. Obviously, if the agitation is sufficiently vigorous to ensure that all of the settleable flocs which may form are moved over into the sedimentation zone, then the agitation is so vigorous that the flocs, if formed, are broken with the result that thereafter the flocs are only re-formed with difficulty into those of a settleable size. As a consequence, the agitators are operated at a relatively slow or reduced speed so that inefficient coagmentation occurs and the settleable flocs form piles of sludge in or adjacent to the flocculation zone. Depending upon the quantity of the sludge and the nature of the sludge, various difficulties may result from its building up into a pile or piles in the tank; it will be obvious in the case of sewage that such a pile would become septic as a result of too long retention or stagnation.

In accordance with this invention, air agitation rather than mechanical agitation is employed, because of the desirable advantages of sweeping out of the liquids any entrained gases, because the flocs can be coagmented as successfully with air as by mechanical means, because any biological demand of the liquid can be satisfied by the aeration, because grease, usually present in sewage, is easily swept out of the water and collected and for other presently detailed reasons.

By effecting flocculation, coagmentation and partial sedimentation on one side of the baffle wall, the other sedimentation region can be utilized to effect a more complete clarification of the effluent liquid. With the liquid circulation between the two sedimentation regions of only limited extent, the sedimentation in each region proceeds under more or less localized conditions; in that region in intimate contact with the aeration-flocculation zone, coagmentation proceeds fairly rapidly and a large portion of the total solids removal is effected in this region; the effluent, partially clarified liquid, passing the baffle to the second sedimentation zone, moves very slowly past the baffle, carrying a relatively low solid content per unit of liquid volume; the effluent liquid removed from adjacent the upper level of the liquid so that the solids are afforded ample opportunity to coagment and settle in the second region without disturbance from the agitation of the aerating stream in the flocculation-coagmentation zone.

In addition to the advantages recited, the present invention also contemplates the utilization of a rake or conveyor structure for removing all of the solids which settle to the bottom of the tank into a sludge collection pocket for eventual removal. In accordance with this invention, the settled solids are swept along the tank bottom from the influent end of the tank to the effluent end, this type of removal of the solids possessing the inherent advantage that thereby the liquid and the separated, settled solids move in the same direction so that the flow of liquid does not tend to break up and destroy the settled flocs as is the case when the settled solids are moved countercurrent to the flow of liquid.

One object of the present invention is to provide an improved process and apparatus for the clarification of turbid liquids and the removal of solids from such liquids.

Another object of the present invention is to provide for the continuous removal of settled solids without interference with the operation of the equipment or the flow of fluid.

A further object of the present invention is to improve the over-all efficiency of a combined flocculation-sedimentation unit.

The invention includes other objects and features of advantage, some of which, together with the foregoing, will be set forth in the following description.

In the drawings accompanying and forming a part hereof, I have illustrated the best embodiment of invention now known to me but such embodiment is to be regarded as typical only of many possible embodiments and the invention is not limited thereto.

In the drawings accompanying and forming a part hereof, Figure 1 is a plan view of the flocculating sedimentation unit of the present invention.

Figure 2 is a section taken along the line 2—2 of Figure 1.

Figure 3 is a section taken along the line 3—3 in Figure 1.

Figure 4 is a section taken along the line 4—4 in Figure 1.

In the drawings, and referring particularly to Figure 1, I have shown a plurality of units 11 in a side by side relation, each unit substantially comprising a tank or horizontal vessel through which liquid is adapted to flow from one end of the tank to the other. Each unit 11 comprises a bottom 12, suitable vertical side walls 13, end walls 14 and 15, and operator walk-ways 28 supported by columns 29. An inlet pipe 10 delivers the influent liquid to be treated to a common launder 17 having a wall 18 over which the liquid flows into each unit; to ensure uniform liquid release into the end units, a baffle 20 is positioned in the launder to ensure uniform liquid release. Intermediate walls 14 and 15 is provided a baffle wall 16 extending transversely of the tank and spaced from the bottom of the tank to permit the fluid to circulate past the baffle wall at a low velocity. The upper end of the baffle wall is positioned below the elevation of launder wall 18 so that fluids can flow over the top of the baffle wall. Along the top of the baffle wall is provided a skimming pipe 19 so that solids floating on the top of the liquid in the tank can be removed.

The baffle wall serves to divide the tanks into a first section 21 and a second section 22. In the first section of the tank, air is released from a plurality of air diffusers generally indicated by numeral 23. In accordance with this invention, the air diffusers are positioned immediately adjacent to the wall 14 at the inlet end of the tank so that the aeration of the liquid and any circulation of fluid due to the release of air takes place in this portion of the tank, the release of air being effective to sweep out any entrained gases, to coagment floc present in the fluid, and to sweep out of the water grease and the like to the top of the water or liquid for removal by the skimming pipe 19. It will be noted that the air diffusers 23 stop short of the baffle wall 16 so that flocculation and sedimentation can occur in tank portion 21 and so that baffle 16, in effect, divides the tank into two immediately adjacent sedimentation zones.

In the second tank section 22, means are provided for withdrawing clarified liquid. This means comprises the launder 26 which is supported between the opposite side walls and by one or more columns 29 and which extends transversely of the tank and leads to an effluent conduit (not shown). Liquid is admitted to the launder 26 by a plurality of feed troughs 27 extending on each side of launder 26 along the run of the tank and supported between trough 26 and operator walk-ways 28. The horizontally extending troughs 27 are relatively shallow in depth to ensure that the liquid entering into the effluent launder 26 is moving at a very slow rate so that any solids in the liquid in a lower portion of the tank are not disturbed.

To provide for removal of settled solids, in accordance with this invention, a movable rake or sludge conveyor is provided for moving the settled solids along the tank bottom. This comprises a first shaft 31 provided at the inlet end of the tank, a second shaft 32 provided at the other end of the tank adjacent to sludge sump 33 and a third shaft 34 provided adjacent wall 15 but toward the top of the tank between shafts 31 and 32. Suitable sprockets 36 are provided on each shaft on opposite sides of the tank; about these are trained suitable conveyor chains 37 carrying a plurality of spaced rake arms 38. Shaft 34 is driven by suitable means (not shown) to move the conveyor chains so that the several rake arms 38 move across the bottom of the tank slowly to sweep solids on toward the sludge sump 33 in the direction of movement of the liquid.

Sludge delivered to the sump 33 is moved into a pocket 41 by the mechanism shown particularly in Figures 2 and 4 and which comprises a shaft 42 supported upon a column 43 and having a sprocket 44 provided adjacent each end. Shaft 42 is driven by a suitable prime mover (not shown) rotating shaft 46, a chain 47 being trained about a sprocket 48 on shaft 46 and about a sprocket 49 on shaft 42. Shaft 51 is provided at one end of sump 33 and shaft 52 at the other end of the sump and adjacent the pocket 41. Sprockets 53 are provided on these and chains 54 are trained about the several sprockets. Upon rotation of shaft 42, conveyor chains 54 are moved to carry arms 56 over the bottom of the sludge pocket 33 and to sweep any sludge therein on into the sludge pocket 41 from which it can be suitably removed.

In operation, with the unit 11 filled with liquid to the level indicated and with air released at a suitable rate through the air diffuser 23, the liquid is swept free of entrained gases while grease and the like is swept to the top of the liquid for removal by the skimming pipe 19. In addition, any flocs present in the liquid are coagmented and caused to form into larger masses which settle, generally between baffle wall 16 and the air diffusers. The substantially clarified liquid flows over or under the baffle 16 into the larger sedimentation zone 42 wherein further opportunity for sedimentation is afforded under nearly absolutely quiescent conditions and free of the disturbing influence of the flocculator-aerator. The finally clarified liquid is removed as it passes over the trough 27 to issue into the launder 26. In this way, the liquid is treated to remove the solids causing turbidity, all portions of the tank being swept by the conveyor structures so that the formation of septic masses is entirely obviated.

I claim:

1. Apparatus for the clarification of turbid liquids having solids therein, consisting of a tank having a bottom, two parallel side walls, and inlet and outlet ends, a turbid liquid inlet at the inlet end, a clarified liquid outlet at an upper portion of the outlet end, a solids outlet at a lower portion of the outlet end of the tank, a baffle between said side walls and having its lower horizontal edge spaced from the bottom of the tank and its upper horizontal edge adjacent the level of the liquid outlet and spaced from the inlet end and the outlet end to divide the tank into (a) an agitation and first sedimentation zone and (b) a second sedimentation zone, means for agitating liquid and solids in the tank in a zone immediately adjacent to the inlet end and spaced from the baffle to provide said first sedimentation zone between the baffle and the agitating means, conveyor means for sweeping solids along the bottom and means for moving said conveyor means to move solids on the bottom from the inlet end through both zones to the outlet end.

2. Apparatus for the clarification of turbid liquids having solids therein, consisting of a tank having a bottom, two walls, and inlet and outlet ends, a turbid liquid inlet at the inlet end, a solids outlet at a lower portion of the outlet end of the tank, a substantially vertical baffle extending from wall to wall and having its lower horizontal edge spaced from the bottom and its upper horizontal edge positioned adjacent the level of the liquid outlet and dividing the tank into (a) an agitation and first sedimentation zone and (b) a second sedimentation zone, means for introducing air to agitate liquid and solids in the tank in a zone immediately adjacent to the inlet end and spaced from the baffle to provide said first sedimentation zone between the baffle and the agitating means, a conveyor having operative and return reaches both passing between the lower horizontal edge of the baffle and the tank bottom and means for moving said conveyor to sweep solids along the bottom from the inlet end through both zones to the outlet end.

3. In apparatus for clarifying liquid including an elongated tank containing a pool of the liquid and in which the liquid flows lengthwise from an inlet end to an outlet end, the combination which comprises an air disperser mounted below the pool level in the inlet end, a baffle disposed across the tank at a substantial distance from the air disperser with a substantial open space in the tank underneath the baffle to permit flow of the liquid and with the top of the baffle approximately at the pool level, there being relatively quiescent zones in the pool adjacent both sides of the baffle, a conveyor for scraping settled solids along the bottom of the tank in the direction of the liquid flow therein and underlying the zone in which the air disperser is disposed and the two quiescent zones, the space between the conveyor and all three zones being substantially unobstructed so that settlement of solids to the bottom can occur in all three zones, and means for removing clarified liquid from the pool in the quiescent zone beyond the baffle.

4. Apparatus according to claim 3 provided with means for removing scum from the pool adjacent the top of the baffle.

5. Apparatus according to claim 3 provided with a second conveyor disposed in the tank transversely to the first adjacent the bottom in the quiescent zone beyond the second baffle for moving solids carried by the first conveyor across the tank bottom, and a sludge pit in the bottom into which the solids are moved by the second conveyor.

6. Apparatus according to claim 3 in which the means for removing clarified liquid from the pool in the quiescent zone beyond the baffle comprises a main launder running across the tank at approximately the level of the pool, and a plurality of collection launders discharging into the main launder and running lengthwise of the tank at approximately the level of the pool.

RICHARD R. KENNEDY.

REFERENCES CITED

The following references are of record in the file of this patent:

UNITED STATES PATENTS

| Number | Name | Date |
| --- | --- | --- |
| 599,957 | Curtis | Mar. 1, 1898 |
| 1,714,739 | Tark | May 28, 1929 |
| 1,981,310 | Currie | Nov. 20, 1934 |
| 2,087,851 | Darby | July 20, 1937 |
| 2,110,721 | Fischer | Mar. 8, 1938 |
| 2,215,185 | Lund | Sept. 17, 1940 |
| 2,272,441 | Streander | Feb. 10, 1942 |
| 2,322,017 | Hartman | June 15, 1943 |
| 2,370,974 | Langdon | Mar. 6, 1945 |

FOREIGN PATENTS

| Number | Country | Date |
| --- | --- | --- |
| 27,240 | Great Britain | 1905 |